United States Patent
Kamdar et al.

(10) Patent No.: US 9,775,129 B2
(45) Date of Patent: Sep. 26, 2017

(54) QUALIFYING LOCATIONS FOR FIXED WIRELESS SERVICES

(71) Applicant: Verizon Patent and Licensing Inc., Arlington, VA (US)

(72) Inventors: Kamlesh S. Kamdar, Dublin, CA (US); Sergio Aguirre, Southlake, TX (US); Raafat Edward Kamel, Little Falls, NJ (US); Lalit R. Kotecha, San Ramon, CA (US); Scott Anthony Townley, Gilbert, AZ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/284,765

(22) Filed: Oct. 4, 2016

(65) Prior Publication Data
US 2017/0026931 A1    Jan. 26, 2017

Related U.S. Application Data (60) Division of application No. 13/208,152, filed on Aug. 11, 2011, now Pat. No. 9,485,667, which is a continuation of application No. 12/854,585, filed on Aug. 11, 2010, now Pat. No. 8,380,184.

(51) Int. Cl.
| | |
|---|---|
| *H04B 7/00* | (2006.01) |
| *H04W 64/00* | (2009.01) |
| *H04W 16/18* | (2009.01) |
| *H04W 24/02* | (2009.01) |
| *H04W 28/02* | (2009.01) |
| *H04W 8/26* | (2009.01) |

(52) U.S. Cl.
CPC ......... *H04W 64/006* (2013.01); *H04W 16/18* (2013.01); *H04W 24/02* (2013.01); *H04W 28/0226* (2013.01); *H04W 8/26* (2013.01)

(58) Field of Classification Search
None
See application file for complete search history.

(56) References Cited

U.S. PATENT DOCUMENTS

| | | |
|---|---|---|
| 4,603,325 A | 7/1986 | Marino et al. |
| 5,561,841 A | 10/1996 | Markus |
| 6,223,054 B1 | 4/2001 | Katko |
| 6,757,532 B1 * | 6/2004 | Haartsen ............... H04L 1/0002 455/414.1 |
| 2002/0160800 A1 | 10/2002 | Rozmaryn |
| 2003/0083104 A1 | 5/2003 | Lohman et al. |
| 2003/0224806 A1 | 12/2003 | Hebron |
| 2004/0242228 A1 | 12/2004 | Lee et al. |
| 2005/0179607 A1 | 8/2005 | Gorsuch et al. |
| 2007/0089157 A1 | 4/2007 | Clark |
| 2007/0173303 A1 | 7/2007 | Viorel et al. |
| 2008/0227401 A1 | 9/2008 | Scherzer et al. |
| 2009/0286544 A1 | 11/2009 | Huber et al. |

(Continued)

*Primary Examiner* — Mohammed Rachedine (57) ABSTRACT

A device receives an address from a computer terminal; determines a location associated with the address; and determines a current signal quality at the location by referencing a file that represents an area that includes the location. The device further determines whether the location qualifies for a fixed wireless service based on the current signal quality. The device also transmits information to the computer terminal. The information indicates whether the location qualifies for the fixed wireless service.

20 Claims, 9 Drawing Sheets

(56) References Cited

U.S. PATENT DOCUMENTS

| | | |
|---|---|---|
| 2009/0298470 A1 | 12/2009 | Huber et al. |
| 2010/0041364 A1 | 2/2010 | Lott et al. |
| 2010/0041365 A1 | 2/2010 | Lott et al. |
| 2010/0062768 A1* | 3/2010 | Lindqvist ................ H04W 8/26 455/435.1 |
| 2010/0142689 A1 | 6/2010 | Hansen et al. |
| 2010/0311321 A1 | 12/2010 | Norin |
| 2010/0313232 A1 | 12/2010 | Norin |
| 2011/0195707 A1 | 8/2011 | Faerber et al. |
| 2011/0212720 A1* | 9/2011 | Hamalainen ........ H04L 41/0677 455/423 |
| 2012/0034912 A1 | 2/2012 | Kamdar et al. |
| 2012/0040663 A1 | 2/2012 | Kamdar et al. |
| 2012/0040664 A1* | 2/2012 | Kamdar ................ H04W 16/18 455/425 |
| 2012/0052857 A1 | 3/2012 | Kumar et al. |

* cited by examiner

QUALIFYING LOCATIONS FOR FIXED WIRELESS SERVICES

RELATED APPLICATIONS

This application is a divisional of U.S. patent application Ser. No. 13/208,152 filed on Aug. 11, 2011, which is a continuation-in-part (CIP) of U.S. patent application Ser. No. 12/854,585, filed Aug. 11, 2010, now U.S. Pat. No. 8,380,184, issued on Feb. 19, 2013, the contents of which are both hereby incorporated herein by reference in their entireties.

BACKGROUND

Bundled media services (e.g., combination packages of television, telephone, and broadband Internet services) have been successfully offered to households with wired connections to service provider networks. Households in areas without such wired connections (e.g., customers in regions that cannot be reached via conventional wired communication media, such as optical cables, copper cables, and/or other fixed wire-based technologies) may rely on fixed wireless services for some of these services (e.g., broadband access). However, previous generations of fixed wireless services have generally been unsuccessful.

As wireless network data rates improve using fourth generation (4G) technologies, such as Long-Term Evolution (LTE), network data rates have become more attractive for fixed wireless networks. However, providers of fixed wireless services are unable to accurately determine which locations qualify (i.e., are able) to receive fixed wireless services without, first, sending technicians to and/or installing or using customer premises equipment (CPE) at the locations.

DETAILED DESCRIPTION OF PREFERRED EMBODIMENTS

The following detailed description refers to the accompanying drawings. The same reference numbers in different drawings may identify the same or similar elements.

An implementation, described herein, may allow remote qualifying of locations for customer premises equipment (CPE), prior to installing the CPE. In one example, a device may receive information associated with cell units (e.g., eNodeBs). The device may, based on the information, generate geographic file(s) that specify current signal quality (e.g., data rates) at different locations, of a customer premises, represented by the geographic file(s). The device may also generate geographic file(s) that specify predictions of future signal quality at the different locations represented by the geographic file(s).

Thereafter, the device may receive an address associated with a customer located at a customer premises. Herein, a customer may refer to any person that is interested in subscribing to fixed wireless services. The device may determine a current signal quality and/or a predicted future signal quality for a location associated with the address by referencing the geographic files. The device may determine whether the location qualifies for fixed wireless services based on the current signal quality and/or the future signal quality. When the location qualifies for the fixed wireless services, the device may further select a tier of service that is available at the location associated with the address. The device may transmit information associated with the selected tier of service to the customer or to a point of sale (POS) of a provider of the fixed wireless services.

Figure 1:
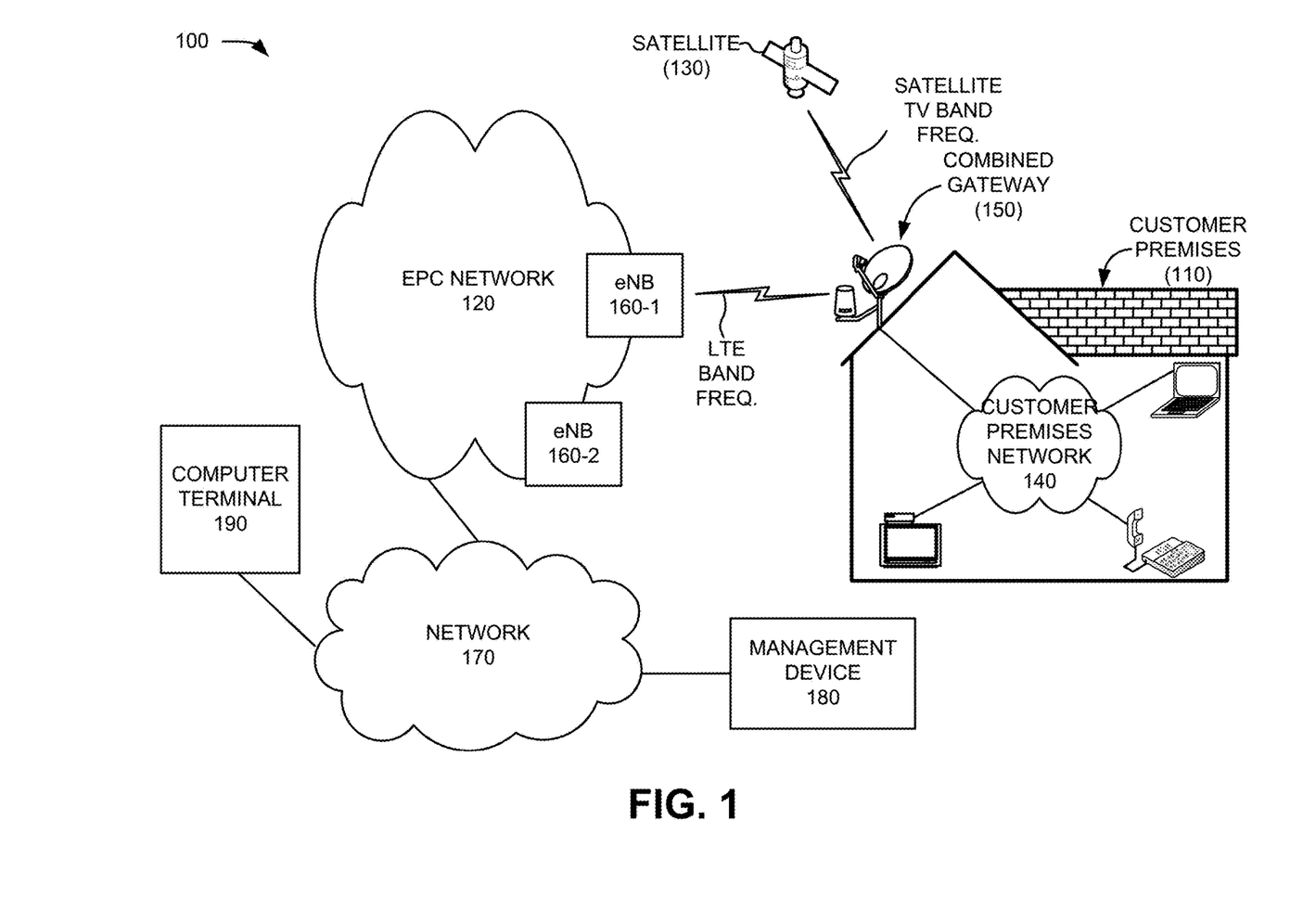
FIG. 1 is a diagram of an example environment in which systems and/or methods described herein may be implemented.

FIG. 1 is a diagram of an example environment 100 in which systems and/or methods described herein may be implemented. As illustrated, environment 100 may include a customer premises 110; an evolved packet core (EPC) network 120, a satellite 130; a customer premises network 140; a combined gateway 150; eNodeBs (eNB) 160-1 and 160-2 (referred to herein collectively as "eNodeBs 160" or generically as "eNodeB 160"); a network 170; a management device 180; and a computer terminal 190. One customer premises 110, one EPC network 120, one satellite 130, one customer premises network 140, one combined gateway 150, two eNodeBs 160, one network 170, one management device 180, and one computer terminal 190 have been illustrated in FIG. 1 for simplicity. In practice, there may be more customer premises 110, EPC networks 120, satellites 130, customer premises networks 140, combined gateways 150, eNodeBs 160, networks 170, management devices 180, and/or computer terminals 190.

Customer premises 110 may include a residence or business. In implementations herein, customer premises 110 may generally rely on wireless communications for television (TV) and broadband services (e.g., instead of conventional wired communication, such as optical cables, copper cables, and/or other fixed wire-based technologies). However, broadband service can be offered independent of television service.

EPC network 120 may include a core network architecture of the 3GPP LTE wireless communication standard. In one example, EPC network 120 may include an all-IP packet-switched core network that supports high-speed wireless and wireline broadband access technologies. In another example, EPC network 120 may provide packet-switched voice services (e.g., which are traditionally circuit-switched) using an Internet Protocol Multimedia Subsystem (IMS) network (not shown).

Satellite 130 may provide multimedia content from, for example, a direct broadcast satellite (DBS) service provider (not shown). Satellite 130 may provide a downlink signal over a designated satellite TV band frequency, typically in the range of a Ku band (e.g., 10.95-14.5 GHz), a Ka band (e.g., 26.5-40 GHz), or 950 MHz to 2150 MHz. The downlink signal may be received using a satellite antenna/receiver system at a customer premises to present satellite TV content to a user.

Customer premises network 140 may include one or more devices connected to each other, eNodeB 160, and/or satellite 130. Devices in customer premise network 140 may include, for example, set-top boxes (STBs), televisions, computers, voice-over-Internet-protocol (VoIP) devices, and home networking equipment (e.g., routers, cables, splitters, local gateways, etc.). In the example shown in FIG. 1, customer premises network 140 is connected to eNodeB 160 through a two-way wireless connection (e.g., using a LTE band frequency) and connected to satellite 130 through a one-way (e.g., downlink) wireless connection (e.g., using a satellite TV band frequency). Customer premises network 140 may combine LTE functionality with satellite TV service. Customer premises network 140 may use combined gateway 150 to bring both broadband (over LTE) service (e.g., via eNodeB 160) and satellite TV service (e.g., via satellite 130) into customer premises 110 over a single coaxial line.

Combined gateway 150 may include devices that provide an interface from EPC network 120 to devices in customer premises network 140 and/or from satellite 130 to devices in customer premises network 140. In one implementation, combined gateway 150 may include an outdoor broadband unit and a satellite antenna. The outdoor broadband unit may utilize a pre-existing or new satellite TV installation in a way that both broadband (over LTE) service and satellite TV are brought indoors (e.g., inside customer premises 110) over a single coaxial cable. While examples have been given above in the context of a satellite TV service, the implementations described herein are not limited to satellite TV service. For example, customer premises network 140 may combine LTE functionality with one or more other types of services.

eNodeB 160 may include a LTE base station that may cover a particular geographic area serviced by EPC network 120. Typically, the geographic area covered by one eNodeB 160 (e.g., eNodeB 160-1) may overlap with a geographic area covered by another eNodeB 160 (e.g., eNodeB 160-2). eNodeB 160 may include one or more devices that receive information, such as voice, video, text, and/or other data, from other network devices and/or that transmit the information to customer premises network 140 via an air interface. eNodeB 160 may also include one or more devices that receive information from devices in customer premises network 140 via an air interface and/or that transmit the information to other network devices.

Network 170 may include one or more wired and/or wireless networks. For example, network 170 may include a direct connection, a cellular network, a public land mobile network (PLMN), a local area network (LAN), a wide area network (WAN), a metropolitan area network (MAN), an intranet, the Internet, an IP-based network, a fiber optic-based network (e.g., a FiOS network), and/or a combination of these or other types of networks. In one example, network 170 may include EPC network 120.

Management device 180 may include one or more server devices, or other types of computation or communication devices, that gather, process, search, and/or provide information in a manner described herein. In one implementation, management device 180 may receive information about eNodeBs 160 and/or about other types of cell units. Management device 180 may generate, based on the information, geographic file(s) that specify current signal quality and/or predicted future signal quality at different locations of customer premises 110. Management device 180 may reference the geographic files to determine whether a particular location, associated with a customer, qualifies to receive fixed wireless services based on a current signal quality and/or a predicted future signal quality at the particular location. Management device 180 may transmit information, associated with whether the particular location is qualified, to computer terminal 190, via network 170.

Computer terminal 190 may include any computation or communication device, such as a communication device that is capable of communicating with management device 180 via network 170. In one implementation, computer terminal 190 may take the form of any computer, including a web service terminal, a personal computer, a laptop computer, a handheld computer, a smart phone, a mobile telephone device, a personal media player, etc. Computer terminal 190 may be operated by a customer who is interested in installing a CPE at a particular location, of customer premises 110, to receive fixed wireless media services at the particular location; an employee, of a service provider who provides the fixed wireless media services, who is assisting the customer; etc.

Computer terminal 190 may receive an address of the particular location as an input. Computer terminal 190 may transmit the address to management device 180. In response, computer terminal 190 may receive information that indicates whether the particular location is qualified to receive the fixed wireless media services at the particular location. The information may also include information about the current and/or predicted future quality of signals (e.g., data rates) that the customer may expect at the particular location and/or other information associated with a tier of service selected for the particular location (e.g., pricing information, types/packages of fixed wireless services that are available at the location, etc.). Computer terminal 190 may display the information received from management device 180.

While implementations are described herein primarily in the context of broadband services via LTE, other wireless standards may be used. For example, components conforming to LTE standards described herein may be replaced by components conforming to other network standards (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.). Furthermore, eNodeB may refer to any other type of cell unit (e.g., a macro base station).

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
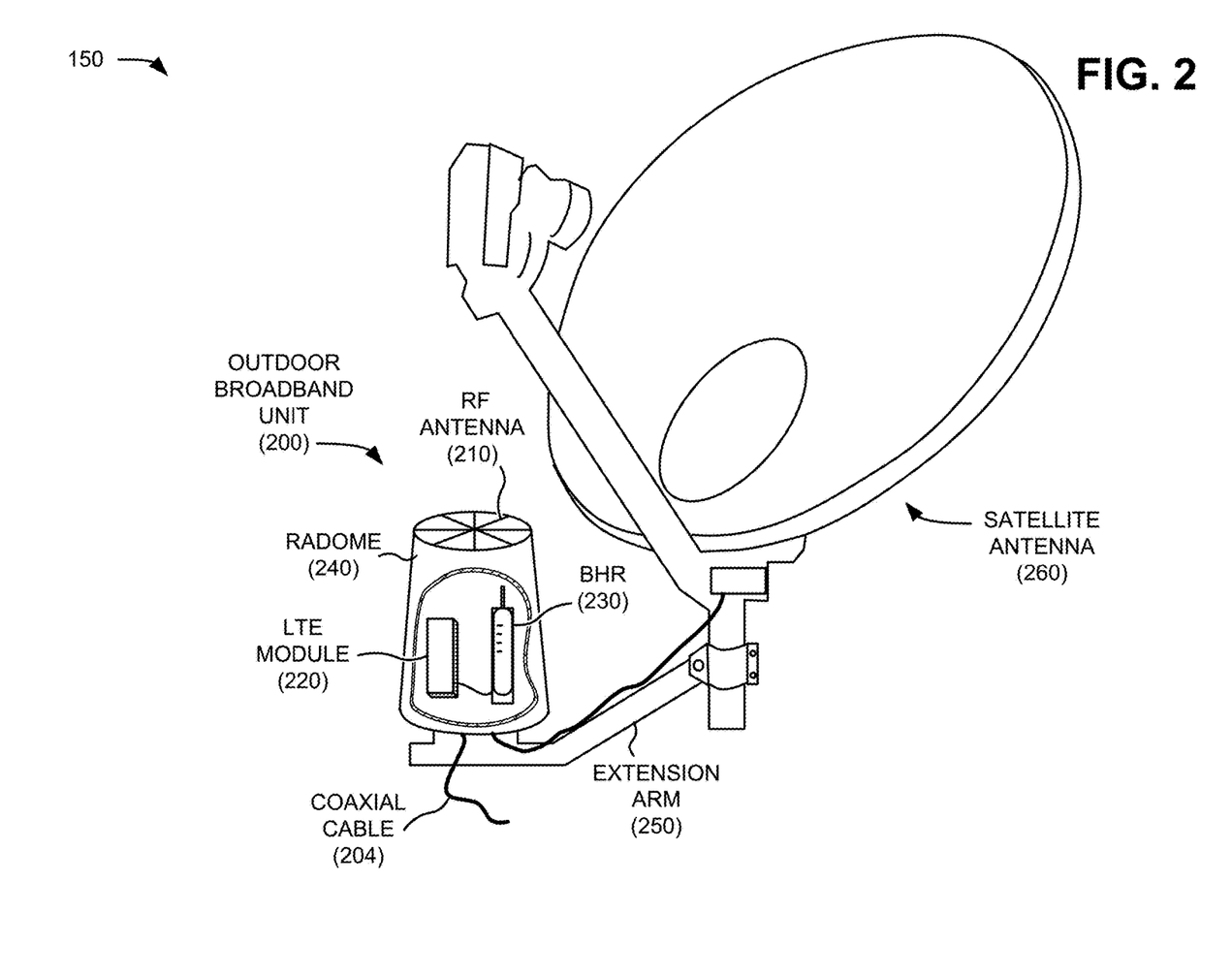
FIG. 2 is a diagram of example components of a combined gateway of the customer premises network depicted in FIG. 1.

FIG. 2 is a diagram of example components of combined gateway 150. As illustrated, combined gateway 150 may include an outdoor broadband unit 200 that includes a radio frequency (RF) antenna 210, a LTE module 220, a broadband home router (BHR) 230, a radome 240, an extension arm 250, and a satellite antenna 260.

Generally, outdoor broadband unit 200 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, outdoor broadband unit 200 may include a wireless gateway that provides a convergence point between wireless protocols (e.g., associated with eNodeB 160) and IP protocols (e.g., associated with devices in customer premises network 140). Outdoor broadband unit 200 may be physically deployed with satellite antenna 260 (e.g., on a roof or a side wall of a house associated with customer premises 110). For example, outdoor broadband unit 200 may utilize a pre-existing or new satellite TV installation in a way that both broadband (over LTE) service and satellite TV are brought indoors (e.g., inside customer premises 110) over a single coaxial cable 204. Components of outdoor broadband unit 200 may also be powered using coaxial cable 204.

RF antenna 210 may include an antenna to transmit and/or receive RF signals over the air. RF antenna 210 may, for example, receive RF signals from LTE module 220/BHR 230 and transmit the RF signals over the air. Also, RF antenna 210 may, for example, receive RF signals over the air and provide them to LTE module 220/BHR 230. In one implementation, for example, LTE module 220/BHR 230 may communicate with a base station (e.g., eNodeB 160) connected to a network (e.g., EPC network 120) to send and/or receive signals from devices in customer premises network 140. In implementations herein, RF antenna 210 may be enclosed by radome 240, integrated with radome 240, or external to radome 240. While one RF antenna 210 is shown in FIG. 2, outdoor broadband unit 200 may include more than one antenna in other implementations.

LTE module 220 may include hardware or a combination of hardware and software having communication capability via an air interface. For example, LTE module 220 may receive broadband signals and/or VoIP signals from eNodeB 160 (e.g., via RF antenna 210) and transmit broadband signals and/or VoIP signals to eNodeB 160 (e.g., via RF antenna 210).

BHR 230 may include a device for buffering and forwarding data packets toward destinations. For example, BHR 230 may receive data packets from eNodeB 160 (e.g., via LTE module 220) and forward the data packets toward customer premises network 140. In addition, BHR 230 may receive data packets from customer premises network 140 and forward the data packets toward recipient devices via EPC network 120. BHR 230 may include a bridge device to receive signals from LTE module 220 via a wired USB connection and convert the signals to an Ethernet over coax signal. The Ethernet over coax signal may be assigned a logical channel (e.g., according to SWiM guidelines) and may be combined with coaxial input from satellite antenna 260.

Radome 240 (shown with cut-away view to reveal LTE module 220 and BHR 230) may provide a weatherproof enclosure to protect RF antenna 210, LTE module 220, BHR 230, and/or other components of outdoor broadband unit 200. Generally, radome 240 may include any RF transparent structure that protects components in an outdoor environment.

Extension arm 250 may provide a structure to support outdoor broadband unit 200 (e.g., via a mounting bracket). In one implementation, extension arm 250 may be connected to a pole supporting satellite antenna 260. In other implementations, extension arm 250 may be connected to another structure. Extension arm 250 may be configured to be connected (e.g., to a pole supporting satellite antenna 260) in a manner that allows extension arm to be secured in any one direction (360 degrees of rotation) perpendicular to the axis of the supporting pole.

Satellite antenna 260 may provide an interface for television service broadcast from satellites. In one implementation, satellite antenna 260 may provide an entry point for a network (e.g., customer premises network 140) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels.

Although FIG. 2 shows example components of combined gateway 150, in other implementations, combined gateway 150 may contain fewer components, different components, differently arranged components, and/or additional components than depicted in FIG. 2. Alternatively, or additionally, one or more components of combined gateway 150 may perform one or more other tasks described as being performed by one or more other components of combined gateway 150.

Figure 3A:
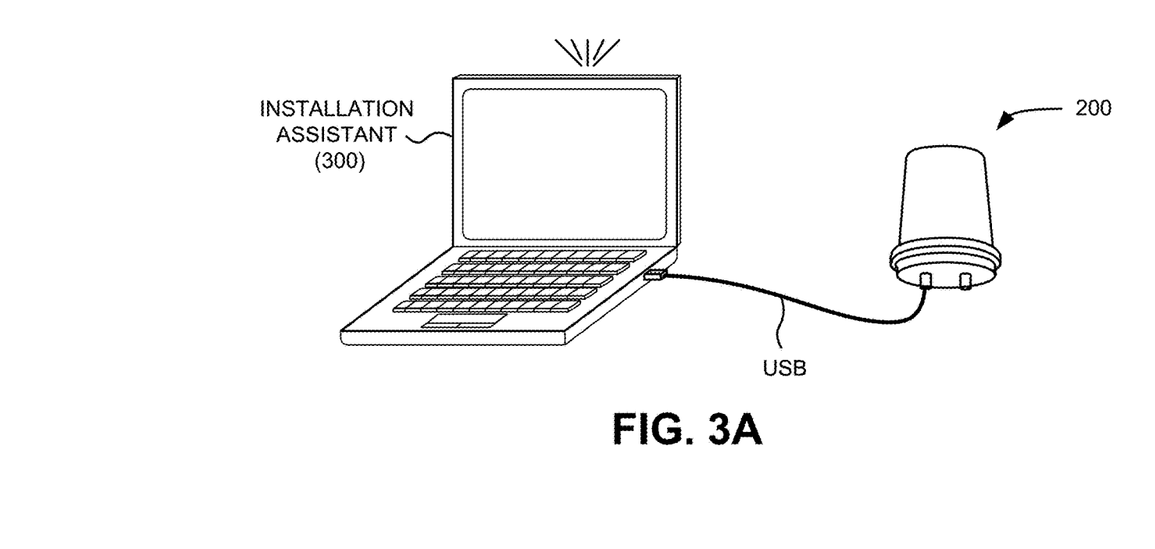
FIGS. 3A-3C are diagrams of example configurations of a CPE installation assistant with an outdoor broadband unit of FIG. 2.
Figure 3B:
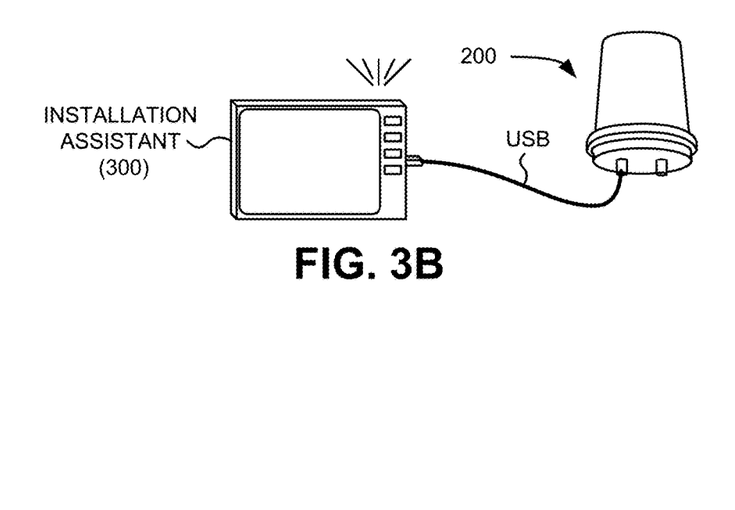
Figure 3C:
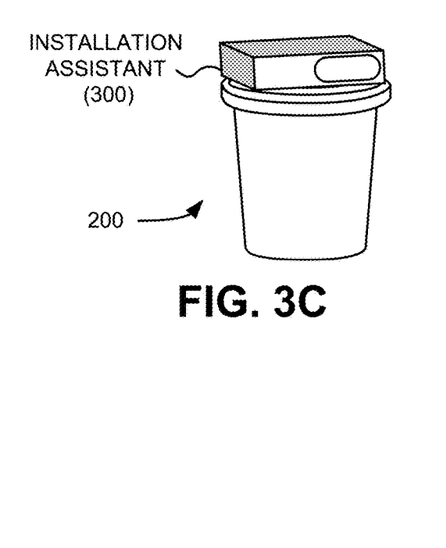

FIGS. 3A-3C are diagrams of example configurations of a CPE installation assistant 300 for use with outdoor broadband unit 200. Referring collectively to FIGS. 3A-3C, CPE installation assistant 300 may include a device executing software to enable selection of an installation location for outdoor broadband unit 200 and/or to provide installation guidance for a technician (e.g., a person installing outdoor broadband unit 200). In an implementation, CPE installation assistant 300 may store and/or retrieve carrier network information (e.g., locations of eNodeBs 160), terrain maps for areas surrounding customer premises 110, real-time location information (e.g., from a GPS locator), RF signal data (e.g., from outdoor broadband unit 200). CPE installation assistant 300 may analyze the stored/retrieved information to select an installation location (e.g., for outdoor broadband unit 200 on customer premises 110) with the highest available RF signal strength, uplink throughput and/or downlink throughput. CPE installation assistant 300 may also be used to ensure outdoor broadband unit 200 is installed at an optimal orientation in the selected location.

Generally, CPE installation assistant 300 may be a mobile device that may be operatively connected to outdoor broadband unit 200 during, for example, pre-installation signal evaluations. As described further herein, a technician may move around customer premises 110 with CPE installation assistant 300 and outdoor broadband unit 200 to collect signal strength data. In one implementation, CPE installation assistant 300 may include a power source (e.g., a battery) to power both CPE installation assistant 300 and outdoor broadband unit 200 during this and other pre-installation procedures.

Referring to FIG. 3A, in one implementation, CPE installation assistant 300 may include a mobile computation and/or communication device, such as a laptop computer (e.g., with a wireless air card), a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a tablet computer, or a GPS device. In one implementation, the CPE installation assistant 300 of FIG. 3A may include an interface capable of connecting to outdoor broadband unit 200 via a universal serial bus (USB) connection or some other type of connection. In another implementation, CPE installation assistant 300 may connect to outdoor broadband unit 200 via a short-range wireless protocols, such as IEEE 802.15 (e.g., Bluetooth).

Referring to FIG. 3B, in another implementation, CPE installation assistant 300 may include a customized mobile computation and/or communication device that may include a dedicated user interface (e.g., dedicated input keys, soft keys, etc.) relating to installation of outdoor broadband unit 200. In the implementation of FIG. 3B, CPE installation assistant 300 may also include communication capabilities to retrieve RF signal data from outdoor broadband unit 200. Similar to the implementation of FIG. 3A, the CPE installation assistant 300 of FIG. 3B may include an interface capable of connecting to outdoor broadband unit 200 via a wired (e.g., USB) or wireless (e.g., Bluetooth) connection.

Referring to FIG. 3C, in a further implementation, CPE installation assistant 300 may include an integrated computation and/or communication device that may attach directly to a communication port and/or otherwise connect to outdoor broadband unit 200. In one implementation, the CPE installation assistant 300 of FIG. 3C may be attached to outdoor broadband unit 200 to begin a pre-installation procedure and may be removed prior to a permanent installation of outdoor broadband unit 200.

Although FIGS. 3A-3C show example configurations of CPE installation assistant 300 with outdoor broadband unit 200, in other implementations, CPE installation assistant 300 and outdoor broadband unit 200 may include different configurations than depicted in FIGS. 3A-3C. For example, in another implementation, CPE installation assistant 300 may be a distributed component.

Figure 4:
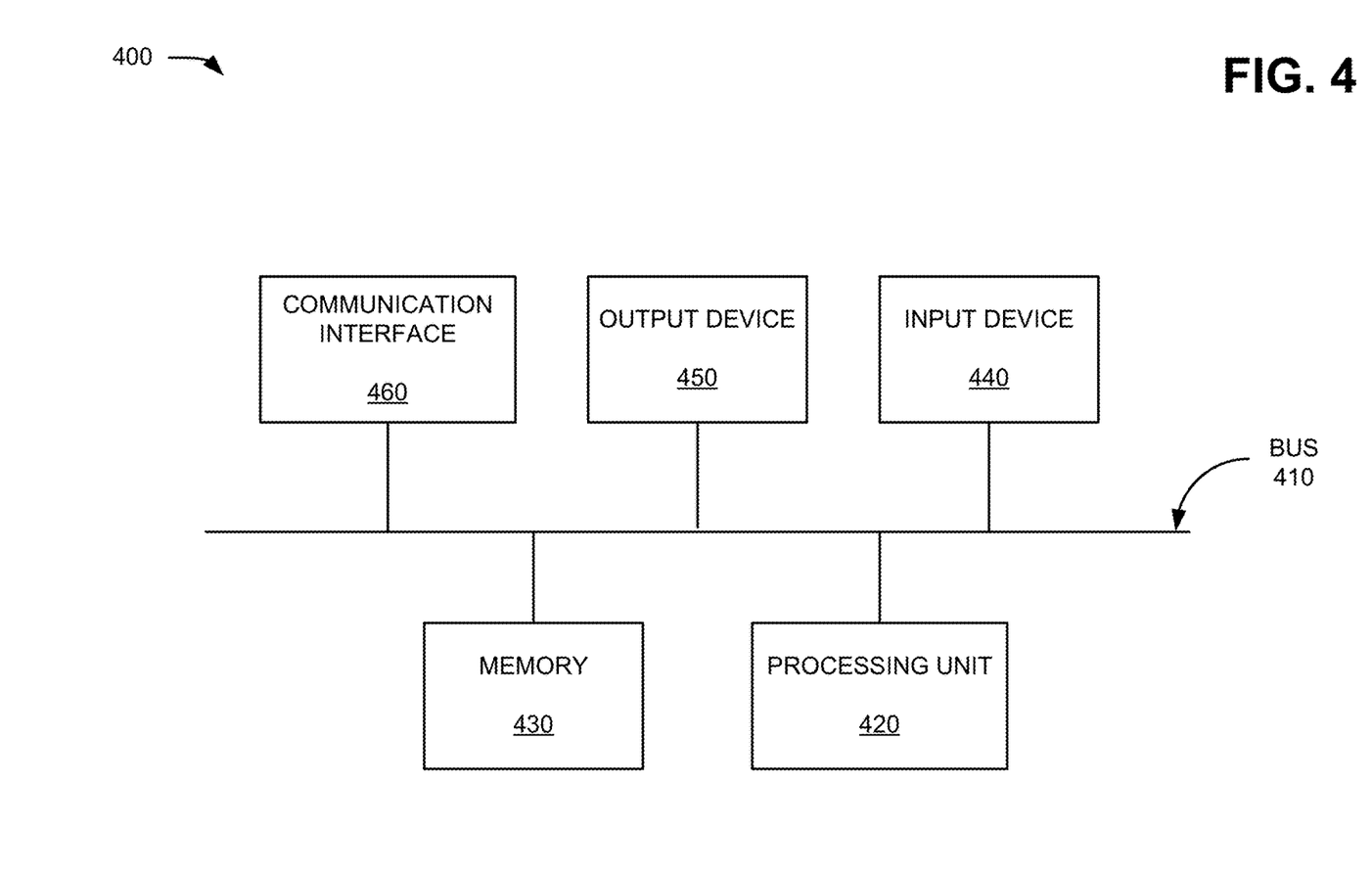
FIG. 4 is a diagram of example components of one or more devices of FIGS. 1-3C.

FIG. 4 is a diagram of example components of a device 400 that may correspond to one or more of management device 180, computer terminal 190, outdoor broadband unit 200, CPE installation assistant 300, and/or components of such devices. As illustrated, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices, such as other devices of environment 100 and/or customer premises network 140.

As described herein, device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more other tasks described as being performed by one or more other components of device 400.

Figure 5:
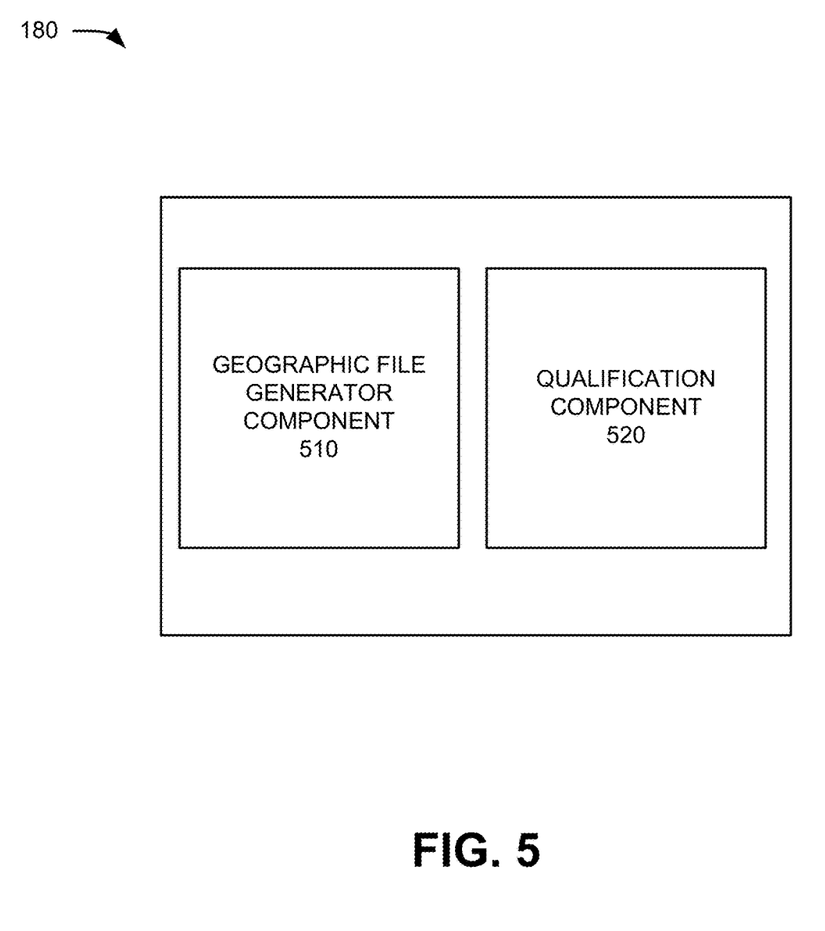
FIG. 5 is a diagram of example functional components of a management device of FIG. 1.

FIG. 5 is a diagram of example functional components of management device 180. In one example, the functional components described in connection with FIG. 5 may be implemented by one or more of the components of device 400 depicted in FIG. 4. As shown, management device 180 may include a geographic file generator component 510 and a qualification component 520. In another implementation, computer terminal 190 may perform one or more functions described as being performed by qualification component 520.

Geographic file generator component 510 may include hardware or a combination of hardware and software that may generate geographic files. In one implementation, geographic file generator component 510 may include a GPS unit that may employ temporal triangulation to determine locations of eNodeBs 160. In another implementation, geographic file generator component 510 may collect and/or retrieve other information about each eNodeB 160. For example, the other information may include one or more of a type of an antenna of eNodeB 160, a height of the antenna, a transmitter power (Radio Frequency (RF) signal readings) of eNodeB 160, a line of site of eNodeB 160, terrain characteristics associated with a location (e.g., rural, suburban, urban, dense urban, hilly, etc.) of eNodeB 160, a traffic load handled by eNodeB 160, etc.

In yet another implementation, geographic file generator component 510 may collect and/or have access to RF parameters associated with locations/areas surrounding eNodeBs 160 (e.g., geographic file generator component 510 may collect RF parameters from installed outdoor broadband units 200). The RF parameters may include, for example, a signal-to-noise ratio (SNR), a received signal strength indication (RSSI), a reference signal received power (RSRP), a reference signal received quality (RSRQ), path loss, and/or other parameters. In still yet another implementation, geographic file generator component 510 may collect and/or retrieve interference information associated with the locations/areas surrounding eNodeBs 160. The interference information may include, for example, information about obstructions in the areas (e.g., tall buildings) and undesired signals from other cell units.

Geographic file generator component 510 may generate geographic files for current signal quality, based on the aforementioned information collected and/or retrieved by geographic file generator component 510, for different geographic areas that include eNodeBs 160. Geographic file generator component 510 may also receive data about future conditions associated with the geographic areas. The data about future conditions may include, for example, information about predicted growth of traffic and plans to install new eNodeBs 160. Geographic file generator component 510 may generate geographic files for predicted future signal quality, based on the geographic files for current signal quality and the data about future conditions, for the different geographic areas that include eNodeBs 160. Geographic file generator component 510 may periodically generate/update the geographic files for current signal quality and the geographic files for predicted future signal quality.

Qualification component 520 may include hardware or a combination of hardware and software that may determine whether a location, associated with a consumer, qualifies to receive fixed wireless services via an installation of CPE (e.g., including outdoor broadband unit 200 of FIG. 2) at the location. In one implementation, qualification component 520 may receive an address of the location. Qualification component 520 may determine latitude and longitude information for the location based on the address. Qualification component 520 may reference, based on the latitude and longitude information, one or more of the geographic files for current signal quality to determine a current signal quality at the location, and/or one or more of the geographic files for predicted future signal quality to determine a predicted future signal quality at the location.

Furthermore, qualification component 520 may determine whether the location qualifies for the fixed wireless media services, via an installation of an outdoor broadband unit, at the location based on the current signal quality and/or the future signal quality. In another implementation, qualification component 520 may select a tier of service for which the location qualifies based on the current signal quality and/or the future signal quality. Qualification component 520 may transmit information associated the qualification of the location and/or the selected tier of service to computer terminal 190.

Although FIG. 5 shows example functional components of management device 180, in other implementations, management device 180 may include fewer functional components, different functional components, differently arranged functional components, and/or additional functional components than depicted in FIG. 5. Alternatively, or additionally, one or more functional components of management device 180 may perform one or more other tasks described as being performed by one or more other functional components of management device 180.

Figure 6A:
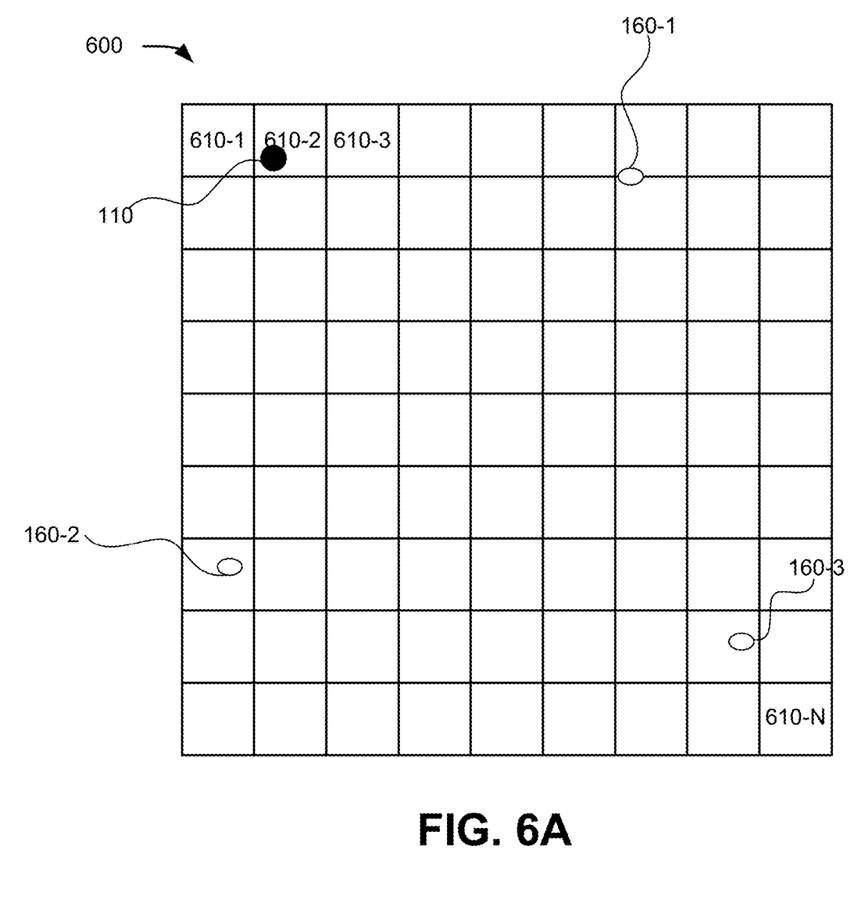
FIG. 6A illustrates an example representation of a portion of a geographic file for current signal quality.

FIG. 6A illustrates an example representation 600 of a portion of a geographic file for current signal quality. As described above, management device 180 may generate the geographic file for an area that includes eNodeBs 160 and customer premises 110.

Representation 600 may include cells 610-1 through 610-N (referred to herein collectively as "cells 610" or generically as "cell 610"). Cell 610 may represent a particular geographic area (e.g., 10,000 square meters). Cell 610 may have an assigned value that represents a current signal quality in the particular geographic area represented by cell 610.

In one example, assume that management device 180 determines that the location of customer premises 110 is within a particular area represented by cell 610-2. Accordingly, management device 180 may determine that the current signal quality at the location of customer premises 110 is equal to the value assigned to cell 610-2 in representation 600.

Figure 6B:
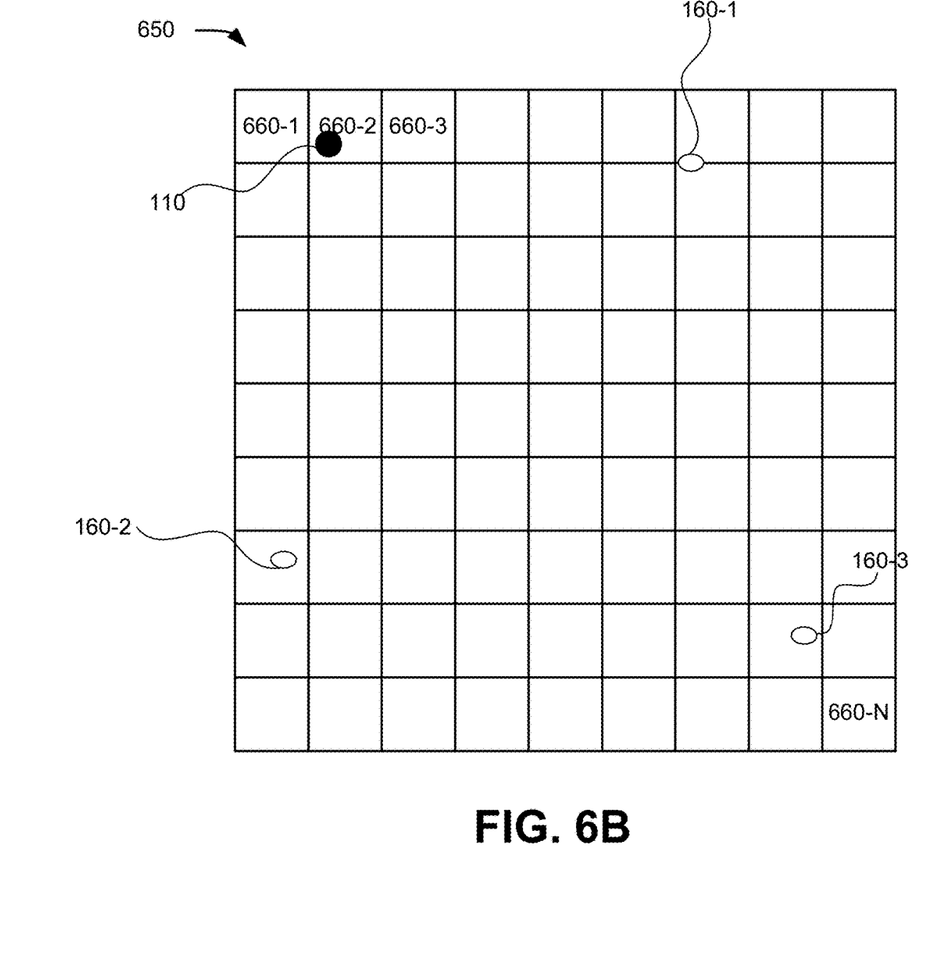
FIG. 6B illustrates an example representation of a portion of a geographic file for predicted future signal quality.

FIG. 6B illustrates an example representation 650 of a portion of a geographic file for future signal quality. As described above, management device 180 may generate the geographic file for future signal quality for the same area that includes eNodeBs 160 and customer premises 110. Management device 180 may generate representation 650 based on representation 600 and based on information associated with future predictions/plans (e.g., growth in traffic, plans to add new cell units (e.g., eNodeBs 160) within the same area, etc.) associated with the same area that is represented by representations 600 and 650.

Representation 650 may include cells 660-1 through 660-N (referred to herein collectively as "cells 660" or generically as "cell 660"). Each cell 660 may correspond to one of cells 610 that represents the same particular geographic area. Cell 660 may have an assigned value that represents a predicted future signal quality in the particular geographic area represented by cell 660 (e.g., cell 660-2).

In the example describe above in reference to FIG. 6A, when management device 180 determines that the location of customer premises 110 is within the particular area represented by cell 610-2, management device 180 may also determine that the location of customer premises 110 is also represented by cell 660-2. Accordingly, management device 180 may determine that the predicted future signal quality at the location of customer premises 110 is equal to the value assigned to cell 660-2 in representation 650.

Figure 7:
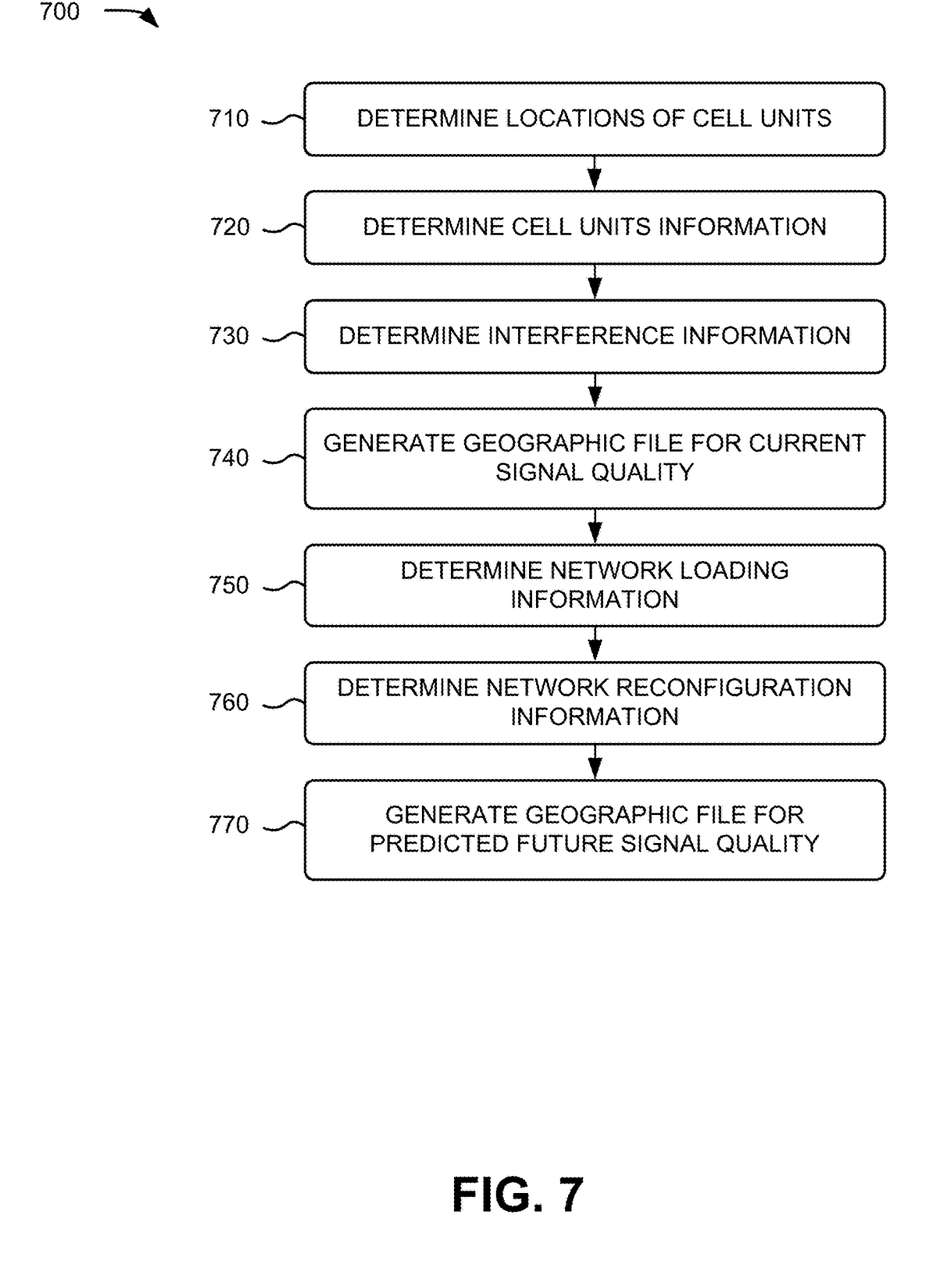
FIG. 7 is a flowchart of an example process for generating geographical files according to an implementation described herein.

FIG. 7 is a flowchart of an example process 700 for generating geographical files. In one implementation, management device 180 may perform process 700. Alternatively, process 700 may be performed by one or more other devices, alone or in combination with management device 180.

As shown in FIG. 7, process 700 may include determining locations of cell units (block 710). For example, management device 180 may determine latitude and longitude information for cell units (e.g., eNodeBs 160) that are located within a particular area. In one implementation, management device 180 may determine the latitude and longitude information based on a terrain map of the particular area and/or cell site location data. The cell site location data my include information about a carrier network (e.g., EPC network 120), such as the locations of all cell units (e.g., eNodeBs 160) or all cell units in a particular geographic region (e.g., including a region where installations of outdoor broadband unit 200 may be performed).

Process 700 may further include determining cell units information (block 720) and determining interference information (block 730). For example, management device 180 may collect and/or retrieve cell units information and/or interference information associated with the cell units (e.g., eNodeBs 160) that are located within the particular area. The cell units information may include, for example, one or more of types of antennas used by the cell units, heights of the antennas, transmitter power (e.g., RF signal readings) associated with the cell units, terrain characteristics associated with locations of the cell units, traffic loads associated with the cell units, RF parameters associated with the cell units, and/or any other information that affects signal levels of the cell units within the particular area. The interference information may include, for example, information about obstructions in the particular area, information about undesired signals from other cell units, and/or information about any other factors that negatively affect the signal quality of the cell units within the particular area.

In one implementation, management device 180 may determine a portion of the cell units information and/or the interference information based on the terrain map and/or the cell site location data. In another implementation, management device 180 may determine a portion of the cell units information and/or the interference information based on information received from the cell units. In yet another implementation, management device 180 may determine a portion of the cell units information and/or the interference information based on information received/collected from outdoor broadband units 200 that are already installed within the particular area.

Process 700 may also include generating a geographic file for current signal quality (block 740). For example, management device 180 may use model(s) (e.g., propagation models, radio planning models, etc.) to determine signal quality at geographic points within the particular area based on the cell units information. Management device 180 may further calculate the presence of interference at the geographic points based on the interference information. Management device 180 may generate, based on output(s) of the model(s) and the presence of interference, one or more geographic files for the current signal quality within the particular area.

Process 700 may also include determining network loading information (block 750) and determining network reconfiguration information (block 760). For example, in one implementation, management device 180 may receive network loading information and/or network reconfiguration information from an operator of the carrier network (e.g., EPC network 120) and/or from one or more other sources. The network loading information may include, for example, predictions about growth of cellular traffic of the carrier network within the particular area and/or information about other factors that may degrade service.

The network reconfiguration information may include, for example, information about plans to add new cell units within the particular area. The information about plans to add new cell units may include dates when the new cell units are planned to be added, locations of the new cell units, expected RF signals of the new cell units, etc. In another implementation, management device 180 may receive data (e.g., expected population growth in the particular area, past history of adding cell units, etc.) that management device 180 may use to calculate/forecast the network loading information and/or the network reconfiguration information.

Process 700 may also include generating a geographic file for predicted future signal quality (block 770). For example, management device 180 may generate geographic files for predicted future signal quality based on the geographic files for the current signal quality, the network loading information, and/or the network reconfiguration information. In one implementation, management device 180 may adjust the values of the current signal quality, represented in the geographic files for the current signal quality, based on the network loading information and/or the network reconfiguration information, to generate the geographic files for predicted future signal quality. The geographic files for predicted future signal quality may specify predicted future signal quality at the geographic points at a particular time in the future (e.g., 3 months, 1 year, 5 years, and/or any other period of time from a current time).

Figure 8:
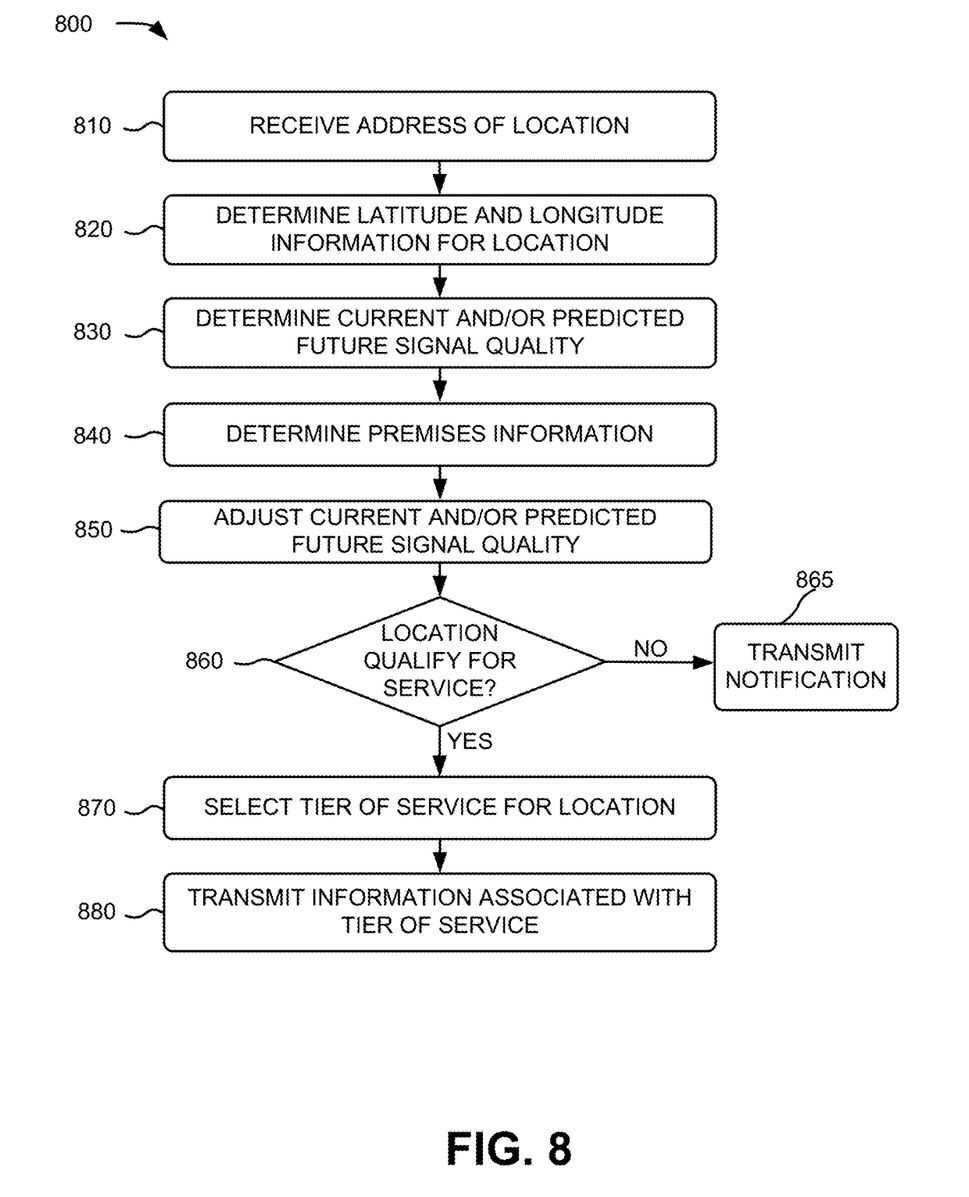
FIG. 8 is a flowchart of an example process for qualifying a location according to an implementation described herein.

FIG. 8 is a flowchart of an example process 800 for qualifying a location. In one implementation, management device 180 may perform process 800. Alternatively, process 800 may be performed by one or more other devices, alone or in combination with management device 180.

As shown in FIG. 8, process 800 may include receiving an address of a location (block 810) and determining latitude and longitude information for the location (block 820). For example, assume that a customer is interested in installing CPE (e.g., combined gateway 150, including outdoor broadband unit 200), in order to receive fixed wireless services, at customer premises 110. Further assume that the customer or another entity (e.g., an employee of a provider of the fixed wireless services) enters an address of the location by using computer terminal 190. Computer terminal 190 may transmit the address to management device 180. Management device 180 may receive the address. Management device 180 may use geocoding and/or another process to determine latitude and longitude information (e.g., geographic coordinates) for the location based on the address.

Process 800 may further include determining current signal quality and/or predicted future signal quality (block 830). For example, management device 180 may retrieve a geographic file for current signal quality and/or a geographic file for predicted future signal quality that represent an area that includes the location, as identified by the latitude and longitude information. Management device 180 may reference, based on the latitude and longitude information, the geographic file for current signal quality to determine the current signal quality at the location. Management device 180 may reference, based on the latitude and longitude information, the geographic file for predicted future signal quality to determine the predicted future signal quality at the location.

Process 800 may also include determining premises information (block 840). For example, management device 180 may determine premises information, associated with customer premises 110 at the location, based on one or more of the latitude and longitude information, terrain maps of the area that include the location, cell site location data, information collected from other installed CPEs within a particular distance/area of the location, information provided by the customer via computer terminal 190, etc. The premises information may include, for example, a type of distance between the location and the nearest cell unit (e.g., eNodeB 160) (e.g., near cell, average/middle distance from cell, far from cell, etc.); a type of terrain associated with the location (e.g., extreme rural, rural, suburban, dense suburban, urban, dense urban, multi-dwelling urban, multi-dwelling dense urban, etc.); a height of a roof or other intended installation area of customer premises 110 (e.g., low height, medium height, high height, etc.); etc.

Process 800 may also include adjusting the current signal quality and/or the predicted future signal quality (block 850). For example, management device 180 may adjust (i.e., increase or decrease) the current signal quality and/or the predicted future signal quality, for the location, based on the premises information. In one example, management device 180 may increase the current signal quality and/or the predicted future signal quality by a particular value when the premises information satisfies particular criteria. The premises information may satisfy the particular criteria when, for example, the premises information indicates that the premises is a particular type of distance from the nearest cell unit (e.g., near cell); that a particular type of terrain is associated with the location (e.g., rural); and that the intended installation area, of customer premises 110, is of a particular type of height (e.g., high height).

Process 800 may also include determining whether the location qualifies for service (block 860). For example, management device 180 may determine whether the location qualifies for fixed wireless services based on the current signal quality, the predicted future signal quality, and/or the premises information. In one implementation, management device 180 may determine that the location does not qualify for service when the current signal quality (and/or the predicted future signal quality) is less than a minimum threshold value. In another implementation, management device 180 may determine that the location does not qualify for fixed wireless services when the premises information indicates, for example, that customer premises 110 is within a zone where fixed wireless services cannot be received regardless of the determined/adjusted current signal quality and/or predicted future signal quality.

If the location does not qualify for service (block 860—NO), process 800 may include transmitting a notification (block 865). For example, management device 180 may generate a notification that specifies that the location, with the address provided by the customer, does not qualify for any fixed wireless services. Management device 180 may transmit the notification to computer terminal 190.

If the location qualifies for service (block 860—YES), process 800 may include selecting a tier of service for the location (block 870). In one implementation, management device 180 may select, for the location, one of a particular quantity of different tiers (e.g., a first tier, a second tier, and a third tier) based on the current signal quality and/or the predicted future signal quality. For example, management device 180 may select the first tier when the current signal quality is greater than a first value and/or the predicted future signal quality is greater than the first value. Management device 180 may select the second tier when the current signal quality is less than the first value and greater than a second value and/or the predicted future signal quality is greater than the first value and greater than the second value. Management device 180 may select the third tier when the current signal quality is less than the second value (and greater than the minimum threshold value).

In another implementation, management device 180 may further use the premises information to select one of the tiers of service. For example, assume that management device 180 selects the first tier based on the current signal quality and/or the predicted future signal quality. Management device 180 may change the selection to the second tier when, for example, the premises information indicates that customer premises 110 is a particular type of distance from the nearest cell unit (e.g., far from cell) and/or that the installation area, of customer premises 110, is of a particular type of height (e.g., low height). In yet another implementation, selecting the tier of service for the location may include determining that the location does not qualify for any fixed wireless service.

Process 800 may also include transmitting information associated with the tier of service (block 880). For example, management device 180 may store and/or have access to information associated with each tier of service. The information associated with the first tier of service may include, for example, a first set of fixed wireless services that are available at the location, a first set of packages of fixed wireless services that are available at the location, prices associated with the first set of fixed wireless services and/or the first set of packages, etc. The information associated with the second tier of service may include, for example, a second set of fixed wireless services available at the location, a second set of packages of fixed wireless services available at the location, prices associated with the second set of fixed wireless services and/or the second set of packages, etc.

The first set of fixed wireless services, the first set of packages of fixed wireless services, the second set of fixed wireless services, and/or the second set of packages of fixed wireless services may include fixed wireless services of the same type and/or of different types. The prices associated with the same type of fixed wireless services may vary based on the tier of service. For example, a price associated with a particular type of service in the first set of fixed wireless services may be greater than a price associated with the particular type of service in the second set of fixed wireless services.

The information associated with the third tier of service may specify, for example, that a technician needs to travel to/visit the location to determine an actual current signal quality and/or the predicted future signal quality at the location before determining which types of fixed wireless services (if any) are available at the location and qualify for any fixed wireless services. Management device 180 may transmit the information associated with the selected tier of service (e.g., second tier) to computer terminal 190. In another implementation, the information associated with the selected tier of service may also include a particular speed/data rate that the user can expect currently and at future point(s) in time.

Thereafter, the customer may select one or more fixed wireless services for customer premises 110. A technician of the provider of the fixed wireless services may install a CPE (e.g., including outdoor broadband unit 200) at the location for customer premises 110 to receive the selected fixed wireless services.

When, or after, the CPE is installed, management device 180 may receive information about actual signal quality (e.g., RF signal readings) and/or other premises information associated with customer premises 110 (and/or the location). Management device 180 may receive the information about actual signal quality and/or the other premises information from a device (e.g., installation assistant 300 of FIG. 300) used, by the technician, to install the CPE and/or from the CPE. Management device 180 may update, based on the actual signal quality and/or the other premises information, the model(s) used to generate geographic file(s). Management device 180 may further update how current signal quality and/or predicted future signal quality are determined, calculated, and/or adjusted based on the actual signal quality and/or the other premises information. For example, management device 160 may adjust the value by which the current signal quality is increased when the particular criteria are satisfied based on particular premises information.

The foregoing description of implementations provides illustration and description, but is not intended to be exhaustive or to limit the possible implementations to the precise form disclosed. Modifications and variations are possible in light of the above teachings or may be acquired from practice of the invention.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a memory configured to store instructions; and
   a processor configured to execute one or more of the instructions to:
   generate a first file that specifies current signal quality at different points within an area,
   generate, based on the first file, a second file that specifies predicted future signal quality at the different points within the area,
   determine a first signal quality at a location based on the first file,
   determine a second signal quality at the location based on the second file,
   select a tier of service, of fixed wireless services, for the location based on the first signal quality and the second signal quality, and
   transmit information associated with the tier of service to a computer terminal.

2. The device of claim 1, wherein, when selecting the tier of service, the processor is configured to execute the one or more of the instructions to:
   select a first tier of service, as the tier of service, when the first signal quality is greater than a first value and the second signal quality is greater than or equal to the first value, and
   select a second tier of service, as the tier of service, when the first signal quality or the second signal quality is less than the first value and greater than a second value.

3. The device of claim 1, wherein the information associated with the tier of service comprises:
   types of the fixed wireless services that are available at the location and prices associated with the types of the fixed wireless services, or
   information specifying that an actual signal quality needs to be determined at the location to determine which one or more of the types of the fixed wireless services are available at the location.

4. The device of claim 3, wherein the prices associated with the types of the fixed wireless services are higher when the tier of service is a first tier of service than when the tier of service is a second tier of service.

5. The device of claim 1, wherein the processor is further configured to execute the one or more of the instructions to:
   determine premises information associated with a premises of the location; and
   adjust, based on the premises information, at least one of the first signal quality and the second signal quality before selecting the tier of service.

6. The device of claim 1, wherein, when generating the second file, the processor is configured to execute the one or more of the instructions to:
   determine at least one of network loading information or network reconfiguration information,
      wherein the network loading information comprises information about predicted growth of traffic in a portion of a cellular network associated with the area, and
      wherein the network reconfiguration information comprises information regarding plans to add new cell units to the portion of the cellular network, and
   generate the second file further based on at least one of the network loading information or the network reconfiguration information.

7. The device of claim 1, wherein, when generating the first file, the processor is further configured to execute the one or more of the instructions to:
   calculate a presence of interference at the different points; and
   generate the first file based on the presence of interference.

8. A method comprising:
   generating, by one or more processors configured to execute one or more instructions stored in a memory, first values that specify current signal quality at different points within an area,
   generating, by the one or more processors, based on the first values, second values that specify predicted future signal quality at the different points within the area,
   determining, by the one or more processors, a first signal quality at a location based on the first values,
   determining, by the one or more processors, a second signal quality at the location based on the second values,
   selecting by the one or more processors, a tier of service, of fixed wireless services, for the location based on the first signal quality and the second signal quality, and
   transmitting information associated with the tier of service to a device.

9. The method of claim 8, wherein selecting the tier of service further comprises:
   selecting, by the one or more processors, a first tier of service, as the tier of service, when the first signal quality is greater than a first quality value and the second signal quality is greater than or equal to the first quality value, and
   selecting, by the one or more processors, a second tier of service, as the tier of service, when the first signal quality or the second signal quality is less than the first quality value and greater than a second quality value.

10. The method of claim 8, wherein the information associated with the tier of service comprises:
    types of the fixed wireless services that are available at the location and prices associated with the types of the fixed wireless services, or
    information specifying that an actual signal quality needs to be determined at the location to determine which one or more of the types of the fixed wireless services are available at the location.

11. The method of claim 10, wherein the prices associated with the types of the fixed wireless services are higher when the tier of service is a first tier of service than when the tier of service is a second tier of service.

12. The method of claim 8, further comprising:
determining premises information associated with a premises of the location; and
adjusting, by the one or more processors, based on the premises information, at least one of the first signal quality and the second signal quality before selecting the tier of service.

13. The method of claim 8, wherein generating the second values comprises:
determining, by the one or more processors, at least one of network loading information or network reconfiguration information,
wherein the network loading information comprises information about predicted growth of traffic in a portion of a cellular network associated with the area, and
wherein the network reconfiguration information comprises information regarding plans to add new cell units to the portion of the cellular network, and
generating the second values further based on at least one of the network loading information or the network reconfiguration information.

14. The method of claim 8, wherein generating the first values comprises:
calculating, by the one or more processors, a presence of interference at the different points; and
generating, by the one or more processors, the first values based on the presence of interference.

15. A non-transitory computer-readable medium comprising instructions, the instructions comprising:
one or more instructions that, when executed by a processor, cause the processor to:
generate a first file that specifies current signal quality at different points within an area,
generate, based on the first file, a second file that specifies predicted future signal quality at the different points within the area,
determine a first signal quality at a location based on the first file,
determine a second signal quality at the location based on the second file,
select a tier of service, of fixed wireless services, for the location based on the first signal quality and the second signal quality, and
transmit information associated with the tier of service to a device.

16. The non-transitory computer-readable medium of claim 15, wherein the one or more instructions that cause the processor to select the tier of service further comprise:
one or more instructions that cause the processor to:
select a first tier of service, as the tier of service, when the first signal quality is greater than a first value and the second signal quality is greater than or equal to the first value, and
select a second tier of service, as the tier of service, when the first signal quality or the second signal quality is less than the first value and greater than a second value.

17. The non-transitory computer-readable medium of claim 15, wherein the information associated with the tier of service comprises:
types of the fixed wireless services that are available at the location and prices associated with the types of the fixed wireless services, or
information specifying that an actual signal quality needs to be determined at the location to determine which one or more of the types of the fixed wireless services are available at the location.

18. The non-transitory computer-readable medium of claim 17, wherein the prices associated with the types of the fixed wireless services are higher when the tier of service is a first tier of service than when the tier of service is a second tier of service.

19. The non-transitory computer-readable medium of claim 15, wherein the one or more instructions further cause the processor to:
determine premises information associated with a premises of the location; and
adjust, based on the premises information, at least one of the first signal quality and the second signal quality before selecting the tier of service.

20. The non-transitory computer-readable medium of claim 15, wherein the one or more instructions that cause the processor to generate the second file further comprise:
one or more instructions that cause the processor to:
determine at least one of network loading information or network reconfiguration information,
wherein the network loading information comprises information about predicted growth of traffic in a portion of a cellular network associated with the area, and
wherein the network reconfiguration information comprises information regarding plans to add new cell units to the portion of the cellular network, and
generate the second file further based on at least one of the network loading information or the network reconfiguration information.

* * * * *